United States Patent [19]
Krimmel

[11] Patent Number: 6,134,035
[45] Date of Patent: Oct. 17, 2000

[54] OPTICAL NETWORK TERMINATION UNIT OF A HYBRID FIBER/COAX ACCESS NETWORK

[75] Inventor: Heinz Krimmel, Korntal-Münchingen, Germany

[73] Assignee: Alcatel, Paris, France

[21] Appl. No.: 08/961,442

[22] Filed: Oct. 30, 1997

[30] Foreign Application Priority Data

Oct. 31, 1996 [DE] Germany ............... 196 43 872

[51] Int. Cl.[7] ............................................. H04J 14/02
[52] U.S. Cl. ...................... 359/125; 359/145; 359/118; 359/137
[58] Field of Search ............................ 359/145, 118, 359/125, 137

[56] References Cited

U.S. PATENT DOCUMENTS

| | | | |
|---|---|---|---|
| 3,701,146 | 10/1972 | Haga et al. | 340/347 |
| 3,940,759 | 2/1976 | Zitelli et al. | 340/347 |
| 3,960,010 | 6/1976 | Gustafsson | 73/88.5 |
| 4,222,077 | 9/1980 | Yamada | 359/280 |
| 4,222,110 | 9/1980 | Judell | 364/724 |
| 4,291,387 | 9/1981 | Buchanan et al. | 364/757 |
| 4,312,073 | 1/1982 | De Niet et al. | 375/19 |
| 4,358,752 | 11/1982 | Tamada et al. | 340/347 |
| 4,438,452 | 3/1984 | Powers | 358/13 |
| 4,455,611 | 6/1984 | Powers | 364/760 |
| 4,550,335 | 10/1985 | Powers | 358/1 |
| 4,588,986 | 5/1986 | Byrne | 340/347 |
| 4,994,909 | 2/1991 | Graves et al. | 358/86 |
| 5,058,102 | 10/1991 | Heidemann | 359/125 |
| 5,517,232 | 5/1996 | Heidemann et al. | 348/7 |
| 5,793,506 | 8/1998 | Schmid | 359/125 |
| 5,815,105 | 9/1998 | Ohie | 341/155 |
| 5,859,895 | 1/1999 | Pomp et al. | 379/29 |

FOREIGN PATENT DOCUMENTS

| | | |
|---|---|---|
| 0024618 | 8/1980 | European Pat. Off. . |
| 3129752 | 2/1983 | Germany . |
| 4433793 | 4/1995 | Germany . |
| 4436818 | 10/1995 | Germany . |
| 4434918 | 4/1996 | Germany . |
| 19505578 | 8/1996 | Germany . |
| 19508394 | 9/1996 | Germany . |

OTHER PUBLICATIONS

Gottlicher, Gerhard, Selb, Michael, Bender, Rolf. Digitale Übertragung von Analogsignalen über LWL–Strecken. In: Electronik 1, 8.1, 1988, pp. 64–68.

*Primary Examiner*—Leslie Pascal
*Assistant Examiner*—Hanh Phan
*Attorney, Agent, or Firm*—Ware, Fressola, Van Der Sluys & Adolphson LLP

[57] ABSTRACT

In a hybrid fiber/coax access network (NET) with a forward channel and a return channel, the return channel serves to transmit voice and video signals as well as data signals from groups of terminals (NT1; NT2) to a subcenter (HUB). Access by a group of terminals (NT1; NT2) to a shared electric line (KOAX1; KOAX2) is obtained by TDMA, FDMA, or CDMA, for example. An optical network termination unit (ONU) is connected to one or more electric lines (KOAX1; KOAX2). For each line or for each separate frequency range of the return channel, the optical network termination unit (ONU) contains an analog-to-digital converter (A/D1, A/D2) which digitizes the received signal. If two or more analog-to-digital converters (A/D1, A/D2) are provided, the individual digitized signals are multiplexed in a multiplexer (MUX) and then fed to a digital electrical-to-optical transducer (E/O2). The electrical-to-optical transducer (E/O2) converts the multiplexed signals to optical signals, which are then transmitted over an optical cable (FIBRE) to the subcenter (HUB), where they are processed digitally.

7 Claims, 1 Drawing Sheet

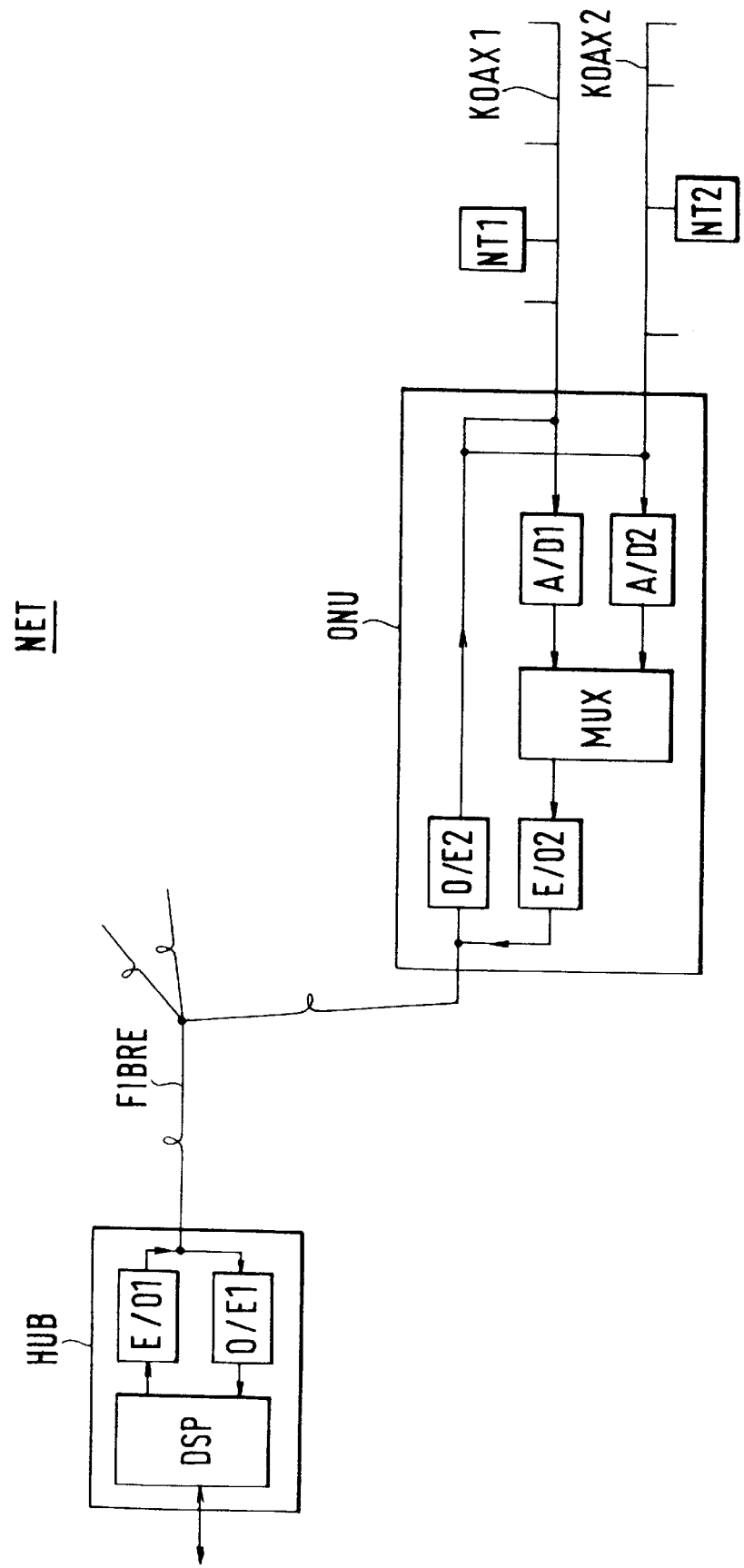

OPTICAL NETWORK TERMINATION UNIT OF A HYBRID FIBER/COAX ACCESS NETWORK

TECHNICAL FIELD

This invention relates to an optical termination unit of a hybrid fiber/coax access network with a forward channel and a return channel. It is also directed and to a method of transmitting electric signals from two or more terminals of a hybrid fiber/coax access network over an electric line and an optical line.

BACKGROUND OF THE INVENTION

A hybrid fiber/coax access network is, for example, a cable television distribution network with a forward channel and a return channel, over which different bidirectional services, such as telephony, Internet communication, or video telephony, can be provided. DE 44 36 818 C1 discloses a subscriber access network for transmitting digital signals of bidirectional interactive telecommunications services. Behind the coaxial cable repeater of a CATV coaxial cable tree network which is closest to a respective subscriber, the optical fibers of a fiber-optic network are bidirectionally connected to the branches of the tree network. Transmission on the optical fibers is digital, for example in the ATM format. This requires a demodulation and/or a frequency conversion of the electric subscriber signals.

SUMMARY OF THE INVENTION

It is therefore an object of the invention to transmit electric signals of a plurality of terminals of a hybrid fiber/coax access network over significant distances, e.g., 50 km, with a smaller amount of technical complexity.

This object is attained by an optical network termination unit of a hybrid fiber/coax access network with a forward channel and a return channel which serves to receive and electrically transmit optical signals in the forward channel and to receive quasi-analog electric signals and optically retransmit said quasi-analog electric signals to digital form in the return channel, which for this purpose comprises an optical-to-electrical transducer, a digital electrical-to-optical transducer, and an analog-to-digital converter, wherein the received electric signals are digitized in the analog-to-digital converter, and wherein the digitized signals are converted to digital optical signals in the digital electrical-to-optical transducer.

The object is also attained by a method of transmitting electric signals from two or more terminals of a hybrid fiber/coax access network over an electric line and an optical line, comprising the steps of transmitting the electric signals of the two or more terminals together over the electric line to an optical network termination unit; and digitizing the signals received in the optical termination unit and then converting the digitized signals to optical signals by means of a digital electrical-to-optical transducer.

A particular advantage of the invention is that a smaller amount of circuitry is required in the optical network termination units to convert the electric signals to optical signals.

Another advantage of the invention is the flexibility of the application of the optical network termination units as a result of the conversion of the electric signals without previous demodulation and the resulting applicability to arbitrarily modulated signals.

BRIEF DESCRIPTION OF THE DRAWINGS

The invention will become more apparent from the following description of an embodiment when taken in conjunction with the accompanying drawing.

The single FIGURE of the drawing is a schematic representation of a novel hybrid fiber/coax access network with a forward channel and a return channel.

BEST MODE FOR CARRYING OUT THE INVENTION

The hybrid fiber/coax access network NET serves to transmit analog and digital television signals as well as data signals, for example, from a subcenter HUB to a plurality of terminals NT1, NT2, and analog and digital voice signals as well as data signals, for example, from the terminals NT1, NT2 to the subcenter HUB. The signals to be transmitted are converted from electrical to optical form, E/O1, at the subcenter HUB, and transmitted in the forward channel over a distribution network consisting of optical cables, e.g., glass fiber cables FIBRE, and optical splitters to a plurality of optical network termination units ONU, of which one is shown. In each optical network termination unit ONU, the received signals are converted from optical to electrical form. Then they are electrically transmitted over coaxial cables KOAX1, KOAX2 to the plurality of terminals NT1, NT2, of which two are shown by way of example. The video signals are, for example, movies, educational programs, or the like, which are selected by subscribers in an interactive mode. The selection of the video signals and the transmission of the data signals, e.g. for Internet access, take place via a return signal which occupies a frequency band between, for example, 5 MHz and 30 MHz.

Groups of terminals NT1; NT2 each have access to the frequency range of the return channel via an electric line associated with the respective group, a coaxial cable KOAX1; KOAX2. The access method used is TDMA (time division multiple access), FDMA (frequency division multiple access), or CDMA (code division multiple access), for example. In all these methods, one electric line is shared by a number of subscribers. Subcarrier modulation is used, so that the signal received at the optical network termination unit ONU is a quasi-analog signal.

Each optical network termination unit ONU has an analog-to-digital converter A/D1, whose input is connected to an electric line, the coaxial cable KOAX1. The quasi-analog signal received over the coaxial cable KOAX1 from the group of terminals NT1 is digitized in the analog-to-digital converter A/D1. The digitization takes place at 80 MHz and with a resolution of 10 bits, for example. Each analog-to-digital converter A/D1 may be preceded by a bandpass filter or a low-pass filter, for example to form frequency subbands or suppress interference, respectively. The digitization is carried out without previous demodulation and without frequency conversion. The received quasi-analog signal is thus fed to the analog-to-digital converter A/D1 unchanged, except that it may have been filtered.

One advantage of the digitization is that by means of digital line equipment containing a digital electrical-to-optical transducer, the digitized quasi-analog signal can be retransmitted, which eliminates the need for the complicated subcarrier signal transmission over optical fibers required with the FDMA method. To transmit the digitized signal, all conventional digital transport methods can be used regardless of the type of modulation employed. Furthermore, processing of the digitized signal at the subcenter HUB by means of a digital signal processor is simpler and lower in cost, since it can be digital, in contrast to analog processing in the case of FDMA.

A disadvantage of the digitization is that in comparison with the transmission over the coaxial cable KOAX1, a wider transmission bandwidth is necessary, which, however, is available on the optical cable FIBRE. The necessary signal-to-noise ratio, however, is substantially reduced because of the digitization. Thus, the transmission of the digitized signal improves the utilization of the capacity of the optical cable FIBRE.

Each optical network termination unit ONU includes a digital electrical-to-optical transducer E/O2 for converting the digitized signal to an optical signal. The electrical-to-optical transducer E/O2 is a directly modulated laser diode, for example. The optical signal is transmitted over the optical cable FIBRE to the subcenter HUB. The optical network termination units use wavelength-division multiplexing with different wavelengths. One optical network termination unit has a laser diode which emits light with a wavelength of 1520 nm, for example, and another has a laser diode which emits light with a wavelength of 1550 nm. The subcenter HUB contains an optical-to-electrical transducer O/E1 for converting the received optical signal back to an electric signal and a digital signal processor DSP for demodulating the electric signal and, for example, for converting the protocol into that of an integrated services digital network. Conventional, analog demodulation after digital-to-analog conversion is also possible.

Each optical network termination unit ONU may further include a second analog-to-digital converter A/D2 and a multiplexer MUX. The analog-to-digital converter A/D2 is connected to a line separated from the electric line KOAX1, namely to the coaxial cable KOAX2. The coaxial cable KOAX2 is connected to a group of terminals NT2 which all have access to the coaxial cable KOAX2. The access method used is TDMA, FDMA, or CDMA, for example.

The analog-to-digital converter A/D2 digitizes the quasi-analog signal received from the terminals NT2 and passes the digitized signal on to the multiplexer MUX. In the multiplexer, the digitized signal from the analog-to-digital converter A/D1 is multiplexed with the digitized signal from the analog-to-digital converter A/D2. The multiplexer MUX combines the two digitized signals into, for example, a signal of double bit rate or operates as a time-division multiplexer, for example. The output of the multiplexer MUX is fed to the digital electrical-to-optical transducer E/O2, where it is converted to an optical signal which is optically transmitted to the subcenter HUB.

The optical network termination unit ONU may also contain three or more analog-to-digital converters. The number of analog-to-digital converters is limited by the ratio of the transmission capacity on the optical cable FIBRE to the sum of the transmission capacities on the electric lines and by the resolution of the analog-to-digital converters. The maximum is reached when the sum of the transmission capacities of the digitized signals is equal to the transmission capacity on the optical cable FIBRE. The transmission capacity available on the optical cable FIBRE can thus be optimally utilized.

In the embodiment, each separate electric line is connected to a respective analog-to-digital converter. Alternatively, two or more electric lines may be connected to only one analog-to-digital converter, or one line may be connected to two or more analog-to-digital converters. The choice of the assignment of electric lines to analog-to-digital converters is dependent on the capacity of the analog-to-digital converters. If an analog-to-digital converter is designed for a bandwidth which is smaller than the frequency range of the return channel, it is appropriate to divide the return channel, for example by means of bandpass filters with different passbands, into separate frequency ranges and to assign a respective analog-to-digital converter to each frequency range. Furthermore, equal frequency ranges of different electric lines could be assigned to one analog-to-digital converter.

What is claimed is:

1. An optical network termination unit (ONU) of a hybrid fiber/coax access network (NET) with a forward channel and a return channel to provide a direct link between an optical line (FIBRE) and an electric line (KOAX1), wherein said optical termination unit (ONU) serves to receive and electrically transmit optical signals in the forward channel and to receive quasi-analog electric signals and optically retransmit said quasi-analog electric signals in digital form in the return channel, said optical network termination unit (ONU) comprising an optical-to-electrical transducer (O/E2) operatively connected to the optical line (FIBRE), a digital electrical-to-optical transducer (E/O2), and an analog-to-digital converter (A/D1), wherein the optical-to-electrical transducer (O/E2) is operatively connected to the optical line (FIBRE) for directly receiving optical signals from the optical line (FIBRE) and converting the received optical signals into electric signals in order to electrically transmit the received optical signals directly to the electric line (KOAX1); and the analog-to-digital converter (A/D1) is operatively connected to the electric line (KOAX1) for directly receiving quasi-analog electric signals from the electric line (KOAX1), converting the quasi-analog electric signals into digitized quasi-analog signals and conveying the digital signals to the electrical-to-optical transducer (E/O2) so as to allow the electrical-to-optical transducer (E/O2) to convert the digitized quasi-analog signals into optical signals for direct retransmitting via the optical line (FIBRE).

2. An optical network termination unit (ONU) as claimed in claim 1, characterized in that the digitization of the received electric signals takes place without previous demodulation.

3. An optical network termination unit (ONU) as claimed in claim 1, characterized in that the optical network termination unit (ONU) comprises at least one further analog-to-digital converter (A/D2) and a multiplexer (MUX) operatively connected to the analog-to-digital converters (A/D1, A/D2), that the at least one further analog-to-digital converter (A/D2) serves to digitize the received signals in a separate frequency range of the return channel, and that the different digitized signals are directly conveyed from the analog-to-digital converters (A/D1, A/D2) to the multiplexer (MUX) in order for the different digitized signals to be multiplexed in the multiplexer (MUX) and then directly fed to the digital electrical-to-optical transducer (E/O2).

4. An optical network termination unit (ONU) as claimed in claim 1, characterized in that a bandpass filter or a low-pass filter is connected ahead of the analog-to-digital converter (A/D1) to form frequency sub-bands or suppress interference, respectively.

5. An optical network termination unit (ONU) as claimed in claim 1, wherein the analog-to-digital converter (A/D1) converts the quasi-analog electric signals into first digitized electric signals, characterized in that the optical network termination unit (ONU) comprises at least one further analog-to-digital converter (A/D2) and a multiplexer (MUX) having an output operatively connected to the electrical-to-optical transducer (E/O2), wherein the at least one further analog-to-digital converter (A/D2) operatively connected to a separate electric line (KOAX2) serves to digitize electric signals directly received from the separate electric line (KOAX2) into second digitized electric signals and wherein the multiplexer is operatively connected to the analog-to-digital converters (A/D1, A/D2) in order to combine the first and second digitized electric signals directly received from the analog-to-digital converters (A/D1, A/D2) into combined signals so as to directly provide the combined signals to the electrical-to-optical transducer (E/O2).

6. An optical network termination unit (ONU) as claimed in claim 5, wherein the quasi-analog electric signals are converted into the first digitized electric signals with a first bit rate and the multiplexer (MUX) combines the first and second digitized electric signals into signals with a second bit rate greater than the first bit rate.

7. An optical network termination unit (ONU) as claimed in claim 1, wherein subcarrier modulation is used to generate the quasi-analog electric signals in order to allow the electric line (KOAX1) to be shared by a plurality of subscribers.

* * * * *